A. GRAN & J. H. KARLSON.
CURVE SCRIBER.
APPLICATION FILED MAY 27, 1909. RENEWED AUG. 31, 1910.
989,547.
Patented Apr. 11, 1911.
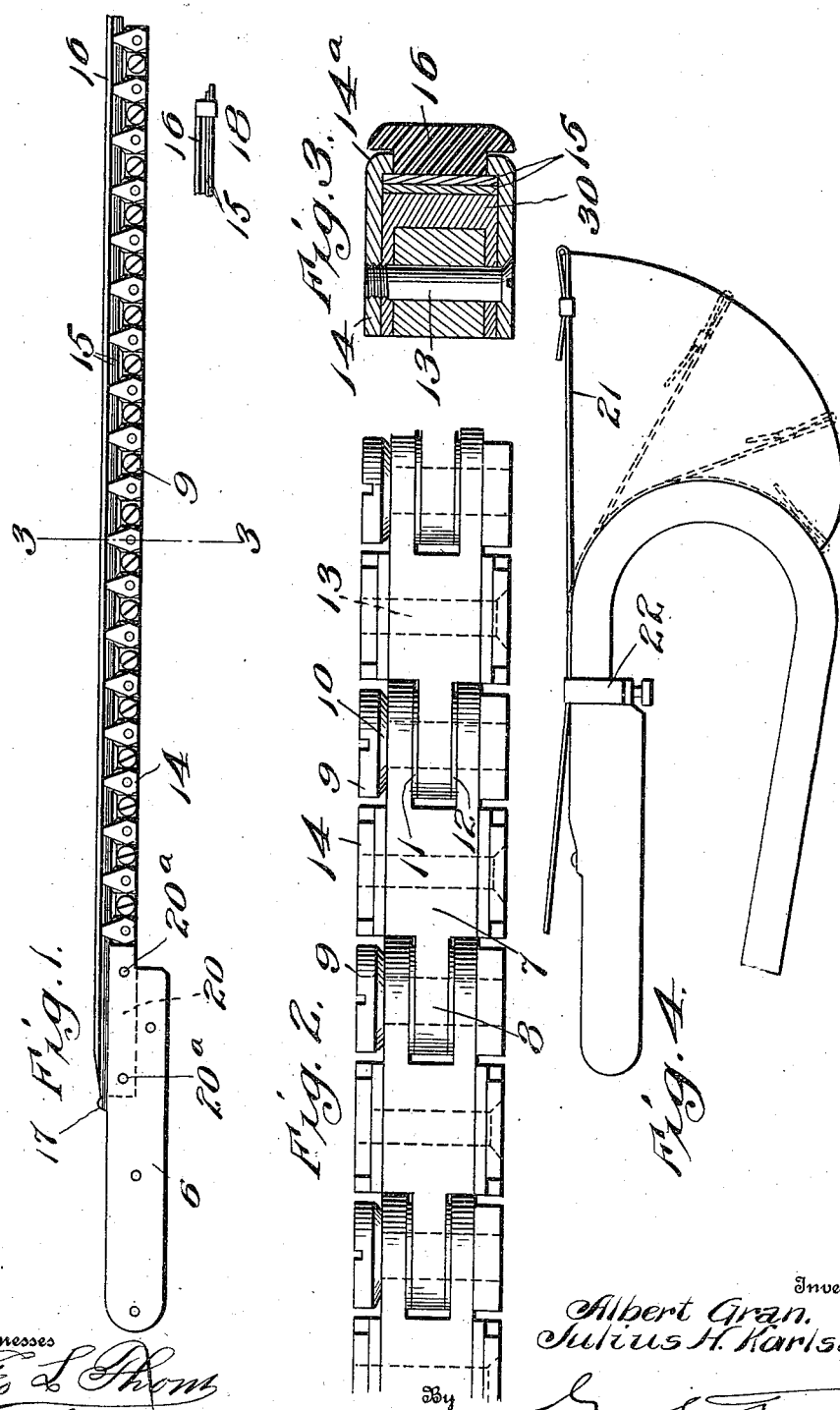
Witnesses
Geo. L. Strom
M. L. Morton
Inventors
Albert Gran.
Julius H. Karlson.
By
Geo. E. Tew
Attorney

UNITED STATES PATENT OFFICE.

ALBERT GRAN AND JULIUS H. KARLSON, OF CHICAGO, ILLINOIS, ASSIGNORS TO DESIGNERS RULE CO., OF CHICAGO, ILLINOIS, A CORPORATION OF ILLINOIS.

CURVE-SCRIBER.

989,547.            Specification of Letters Patent.      Patented Apr. 11, 1911.

Application filed May 27, 1909, Serial No. 498,694. Renewed August 31, 1910. Serial No. 579,912.

*To all whom it may concern:*

Be it known that we, ALBERT GRAN and JULIUS H. KARLSON, citizens of the United States, residing at Chicago, in the county of Cook and State of Illinois, have invented certain new and useful Improvements in Curve-Scribers, of which the following is a specification.

This invention relates to curve scribers for the use of draftsmen, for the purpose of drawing irregular curves, and it also comprises an attachment for drawing involute curves as more fully hereinafter explained.

With the instrument herein described curves can be drawn ranging from a straight line to a curve of very small radius.

The device retains the shape to which it is adjusted, but can be readily changed by the operator from one position to another. It is capable of a variety of uses, such as for taking the shape of machine parts, including cavities, and for laying out the shapes on paper, for copying and drawing ellipses, parabolas and other curved forms, including the involute and cycloidal curves, for generating gear teeth, and for producing artistic forms for stencils and the like.

The device comprises a series of jointed sections, and a flexible rule or strip connected to said sections, the sections being joined by friction joints, whereby they may be bent to any regular or irregular form desired.

The invention is illustrated in the accompanying drawings in which—

Figure 1 is a plan view of the instrument; Fig. 2 is a rear view of a part or section thereof, enlarged; Fig. 3 is a section on line 3—3 of Fig. 1. Fig. 4 is a plan view illustrating the use of the device for drawing involute curves.

Referring specifically to the drawings, 6 indicates a handle at one end of the rule, provided for the convenient manipulation thereof. The flexible portion of the rule consists of a succession of short sections 7 each of which preferably comprises a small metal block tongued at opposite ends, as indicated at 8, to match with the grooved ends of the adjacent sections and to form pivotal joints therebetween, which are completed by screws 9 extending through the tongued portions of the blocks, the pivots being perpendicular to the length of the rule. In order to form a friction joint which will stay as set, a spring washer 10 of dished metal is interposed under the head of the screw, and flat washers 11 and 12 are placed between the halved ends of the sections. Each block or section has projecting therefrom fingers 14 which are located on opposite sides of the block and are bent in or toward each other at the ends, as indicated at 14$^a$, forming hooks to retain metal strips 15 which are of proper size and shape to fit within the hooked portions of the fingers. The strips are free to slide or move lengthwise to a limited extent in the guide way thus formed by the fingers, the construction being such that there will not be any perceptible lateral movement of the strips, that is, any movement toward or from the blocks or sections, but a slight looseness in the direction of the width of the strips is not objectionable since it will not affect the resulting line. The strips 15 are made of flexible metal such as steel ribbons, and to the outer strip is cemented or otherwise secured a facing strip 16 of rubber or rubber composition, capable of assuming all the positions into which the rule may be bent. The strip 18 is offset outwardly beyond the ends of the fingers so that the fingers will not interfere with the movement of a pencil along said strip, at either edge thereof.

The fingers 14 preferably are made separately and attached to the blocks by screws 13 or the like, an angular piece 30 being placed around each block if desired. The sections are also preferably screwed together at the joints, but other means may be used instead of the screws, if desired, these being matters of mechanical detail optional with the manufacturer. One end of the strips 15 and 16 is fastened to the handle 6 by a screw 17. The other end is free, the strips, however, being preferably connected together at the free end by a strap 18, and in order to accommodate the variation in length incident to curvature of the rule, the strips are made somewhat longer than the jointed sections. Each section is made so short that when the rule is bent the strips will assume a perfect curve although this result practically follows from the elasticity of the metal strips 15, which causes the rule to naturally assume a regular curved line between the points at which it is held by the fingers 14. The end section is conveniently made with a shank 20 which is inserted in the handle and fastened by screws 20ª so as to form a fixed connection between the ruler and the handle.

As stated the joints are frictional joints, of sufficient stiffness to stay in the position in which they are placed. In the use of the device the rule is bent by special effort to the form desired, and will remain in such form while in use, or it may be applied to a piece of work and bent according to the outline thereof, and then it can be used to draw the curve or outline. It is to be noted that the rule can be bent so that the strip 16 will occupy either the inner or the outer position with respect to the center of the arc, loop or curve to be drawn.

For drawing involute curves we provide an attachment consisting of a strip 21 of celluloid or other flexible material which is fastened at one end to the handle of the rule by means of a clamp 22. At the free end the strip has a loop 23 through which the point of a pencil may be inserted. In scribing an involute the rule is placed on the board or paper with its outline matching the base circle or curve, and the strip 21 is adjusted to bring its loop to proper position, and then by swinging or carrying the pencil outwardly it will be guided by the unwinding of the strip from the periphery of the rule and so form the corresponding involute. For a cycloidal curve two of the rules may be used, the periphery of one being rolled on the periphery of the other, after being first bent to the desired radii.

The device is capable of a variety of uses which need not be detailed, no limitation being implied with respect to use, from anything above described.

Obviously many changes may be made in the mechanical construction, with respect particularly to the form and construction of the joints between the sections and to the material of the strips and the manner of attaching the same to the sections. The use of spring washers of ascertained strength, at the pivots, will give a practically constant tension or friction for a long period of time.

We claim:

1. A rule comprising a series of short sections pivotally joined together, and a flexible member extending along the same and in contact therewith along the whole length of said member, said member having longitudinal movement with respect to the sections, incident to flexion of the joints, the sections having projecting fingers engaging the member at opposite edges thereof.

2. A rule comprising a series of sections pivotally joined together, hooked fingers projecting from opposite sides of said sections, a flexible strip extending along said sections and engaged by the hooks at opposite edges thereof, and a flexible facing strip fastened to said strip and offset outwardly at opposite edges thereof, beyond the fingers.

In testimony whereof, we affix our signatures in presence of two witnesses.

ALBERT GRAN.
JULIUS H. KARLSON.

Witnesses to signature of Albert Gran:
H. G. BATCHELOR,
NELLIE FELTSKOG.

Witnesses to signature of Julius H. Karlson:
ROBERT STEIN,
W. J. CARPENTER.

---

Copies of this patent may be obtained for five cents each, by addressing the "Commissioner of Patents, Washington, D. C."